(12) United States Patent
Israeli et al.

(10) Patent No.: US 8,930,150 B2
(45) Date of Patent: Jan. 6, 2015

(54) LEAK DETECTION IN A FLUID DISTRIBUTION NETWORK

(75) Inventors: Eitan Israeli, Reut (IL); Lena Granovsky, Haifa (IL); Yossi Shiloach, Aviel (IL); Ofer Michael Shir, Jerusalem (IL); Segev Wasserkrug, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 13/363,403

(22) Filed: Feb. 1, 2012

(65) Prior Publication Data
US 2013/0197833 A1 Aug. 1, 2013

(51) Int. Cl.
G01M 3/00 (2006.01)
G01M 3/28 (2006.01)

(52) U.S. Cl.
CPC .................... G01M 3/2815 (2013.01)
USPC ............................................. 702/51

(58) Field of Classification Search
CPC .................................... G01M 3/2815
USPC .............................................. 702/51
See application file for complete search history.

(56) References Cited

U.S. PATENT DOCUMENTS

| | | | |
|---|---|---|---|
| 6,912,472 | B2 | 6/2005 | Mizushina et al. |
| 8,720,481 | B2 * | 5/2014 | Guy ............................. 137/486 |
| 2006/0048563 | A1 | 3/2006 | Martinek |
| 2007/0288200 | A1 | 12/2007 | Guidi et al. |
| 2009/0066524 | A1 | 3/2009 | Yukawa et al. |
| 2010/0212748 | A1 | 8/2010 | Davidoff |
| 2011/0303311 | A1 * | 12/2011 | Klicpera ........................ 137/551 |

OTHER PUBLICATIONS

Yi Wu et al., "Pressure-Dependent Leak Detection Model and Its Application to a District Water System", Journal of Water Resources Planning and Management, vol. 136, No. 1, pp. 116-128, Jan./Feb. 2010.
Karney et al.,"A Simulation study on using inverse transient analysis for leak detection in water distribution networks", Tech. Rep. NRCC-50452, 2009.
Mounce et al.,"Sensor-fusion of hydraulic data for burst detection and location in a treated water distribution system", Information Fusion, vol. 4, Issue 3, pp. 217-229, Sep. 2003.
United States Environmental Protection Agency (EPA), Control and Mitigation of Drinking Water Losses in Distribution Systems, Office of Water (4606M), EPA 816-R-10-019, Nov. 2010.
Poulakis, "Leakage detection in water pipe networks using a Bayesian probabilistic framework", Probabilistic Engineering Mechanics, vol. 18, Issue 4, pp. 315-327, Oct. 2003.

(Continued)

Primary Examiner — Bryan Bui
(74) Attorney, Agent, or Firm — Jason Sosa; Suzanne Erez (57) ABSTRACT

Systems and methods for detecting leaks in a fluid distribution network are provided. In one embodiment, the method includes calculating value of non-revenue fluid. Further, the method includes receiving data corresponding to pressure from pressure sensors in the fluid distribution network and receiving data corresponding to flow from flow sensors in the fluid distribution network. Furthermore, the method includes estimating pressure values at the pressure sensors and estimating flow values at the flow sensors. The received data and estimated values of respective sensors for corresponding time periods are compared. Existence of leak in the fluid distribution network is detected if the value of non-revenue fluid is non-zero. One or more leak spots are located, if a leak is detected, by solving an optimization problem.

25 Claims, 7 Drawing Sheets

(56) References Cited

OTHER PUBLICATIONS

P. F. Boulos and A. S. Aboujaoude, "Managing leaks using flow step-testing", network modeling, and field measurement, Journal of American Water Works Association, vol. 103, No. 2, pp. 90-97, Feb. 2011.

Araujo et al., "Pressure Control for Leakage Minimisation in Water Distribution Systems Management", Journal of Water Resources Management, 2006.

Nicolini & Zovatto, "Optimal Location and Control of Pressure Reducing Valves in Water Networks", Journal of Water Resources Planning and Management, 2009.

Nicolini et al., "Calibration and Optimal Leakage Management for a Real Water Distribution Network", Journal of Water Resources Planning and Management, 2011.

Nazif et al., "Pressure Management Model for Urban Water Distribution Networks", Journal of Water Resources Management, 2010.

Vitkovsky et al., "Leak Detection and Calibration Using Transients and Genetic Algorithms", Journal of Water Resources Planning and Management, 2000.

Yang et al., "The Genetic-Algorithm-Enhanced Blind System Identification for Water Distribution Pipeline Leak Detection", Journal of Measurement Science and Technology, 2007.

* cited by examiner

LEAK DETECTION IN A FLUID DISTRIBUTION NETWORK

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to fluid distribution networks and, more particularly but not exclusively, to a system and method for detecting and locating leakage in fluid distribution networks.

BACKGROUND

Conventional fluid distribution networks include pipelines, storage reservoirs, valves and sensors, which facilitate distribution of fluids, such as, water, oil and gas. Various elements within such fluid distribution networks are susceptible to leakage. Leakage within fluid distribution networks has several disadvantages, for example, leakages result in inefficient fluid distribution. Further, delay or failure to locate the leakage spots, not only leads to waste, but also leads to hazardous scenarios, such as, surface collapse due to subterranean erosion.

Conventional leak detection schemes employ acoustic instruments which involve attaching listening devices to pipes or appurtenances to detect leak-induced sound. Ground microphones can also be used for spotting leaks by listening on the pavement surface or soil directly above a leaking pipe. Other conventional techniques include using radar or microwave technologies for surveying large parts of a distribution network to spot leaks.

The above techniques require significant investment in leak detection apparatus, skilled manpower and time to survey areas to spot leaks. Unfortunately, this often results in extensive loss of fluid, impact to customer service, and incurring significant costs. Additionally, the authorities associated with the distribution network get to know of the leak, generally, only upon receiving reports corresponding to visible leaks, deteriorated service due to pressure drop, or overvalued bills.

Further, most conventional techniques are invasive in nature, requiring digging, street closures and service shutdown to parts of the distribution network that may or may not be affected. Improved leak detection techniques that can more efficiently and non-invasively detect and locate leaks in fluid distribution networks are desired.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for detecting leaks and locating leak spots in a fluid distribution network is provided. In one embodiment, the method comprises calculating value of non-revenue fluid; receiving data corresponding to pressure from pressure sensors in the fluid distribution network and receiving data corresponding to flow from flow sensors in the fluid distribution network. Furthermore, the method includes estimating pressure values at the pressure sensors and estimating flow values at the flow sensors. The received data and estimated values of respective sensors for corresponding time periods are compared. Existence of leak in the fluid distribution network is detected if the value of non-revenue fluid is non-zero. One or more leak spots are located, if a leak is detected, by solving an optimization problem.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
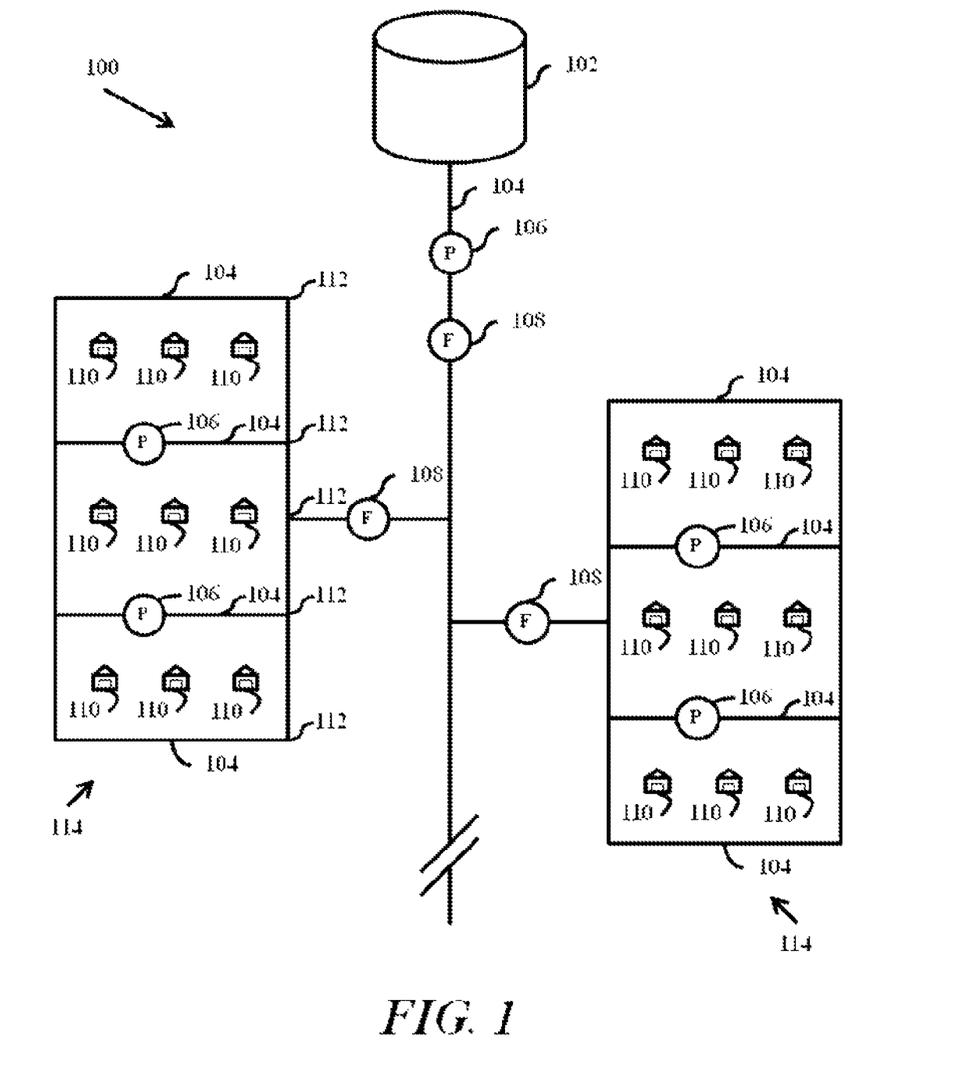
FIG. 1 is a block diagram illustrating a fluid distribution network 100, in accordance with one embodiment.

Referring to FIG. 1, a leak detection mechanism for a fluid distribution network 100 is provided. As shown, the fluid distribution network 100 is configured to distribute water to a plurality of utilization points 110. Fluid distribution network 100, in one embodiment, includes a water reservoir 102, pipes 104, pressure sensors 106, flow sensors 108 and pipe joints 112. Other elements, such as flow control valves and metering equipments, which are not illustrated in FIG. 1, may also be present in the fluid distribution network 100.

The water reservoir 102 is configured to store water that will eventually be distributed to the water utilization points 110. Water in the reservoir 102 flows through one or more main pipes 104, and further into water distribution blocks 114. The reservoir 102 may include level sensors that facilitate determination of water level in the reservoir 102. The pressure and the flow rate of the water from the reservoir 102 may be determined using pressure sensor 106 and flow sensor 108, which may be placed in the vicinity of the reservoir 102 within the network 100.

Depending on implementation, sensors may be placed near a water exit valve (not shown) of the reservoir 102. Placement of such sensors will facilitate determination of the amount of water supplied to the network 100 by the reservoir 102. It is noteworthy that the above-suggested sensor placement is exemplary in nature and in other embodiments, different methods may be used to determine the amount of water being supplied by the reservoir 102. Accordingly, the water from the reservoir 102 is routed into water distribution blocks 114 via pipes 104.

At the beginning of each water distribution blocks 114, a flow sensor 108 may be placed. The flow sensor 108 facilitates determination of the flow rate and the amount of water routed into each of the water distribution blocks 114. It is noted that flow sensor 108 and pressure sensors 106 may be placed at various locations, as found suitable. The water that is routed in the water distribution blocks 114 is supplied to water utilization units 110. Each of the water utilization units 110 may be configured with water metering devices (not shown in FIG. 1) that can facilitate determination of water being consumed by the respective water utilization units 110.

The pressure sensor 106, flow sensor 108 and other water metering devices may be configured to communicate data gathered by them to a system configured for detecting leaks and locating leak spots in fluid distribution network 100. It is noted that the above discussed sensors or devices or other sensors or devices may be placed in different locations in the fluid distribution network and depending on implementation may be configured to communicate data to a system configured for detecting leaks and locating leak spots in the fluid distribution network 100.

Figure 2:
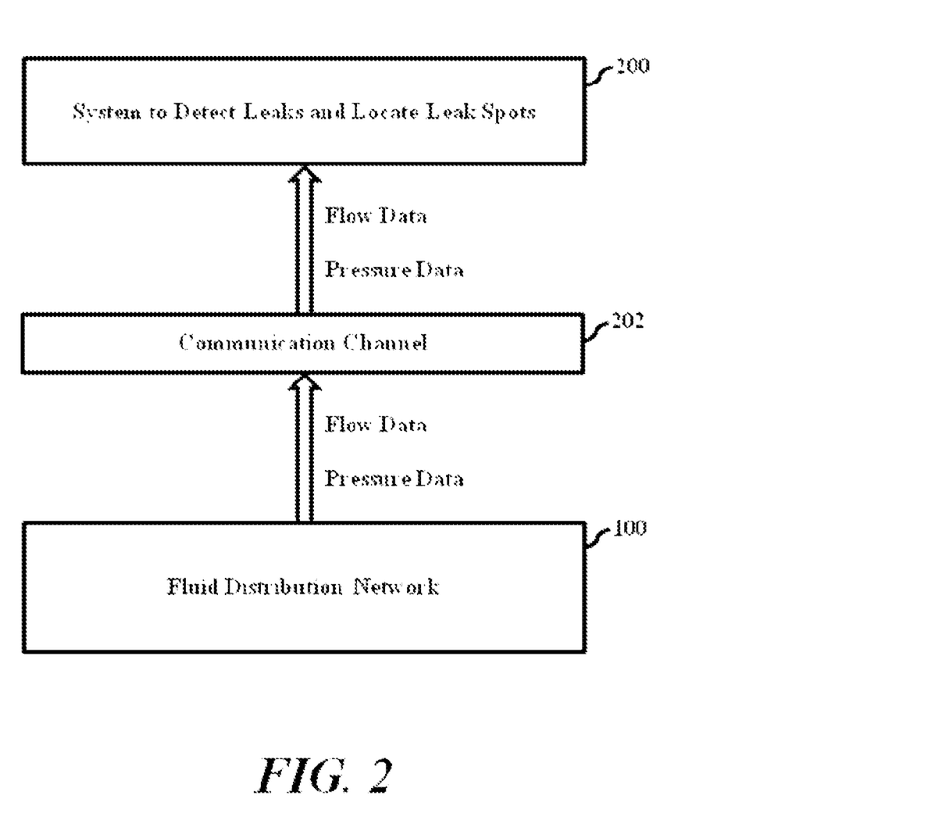
FIG. 2 is a block diagram illustrating communication of data between a fluid distribution network and a system configured to detect leaks and locate leak spots in the fluid distribution network, in accordance with one embodiment.

FIG. 2 is a block diagram illustrating communication of data between the fluid distribution network 100 and a system 200 configured to detect leaks and locate leak spots in the fluid distribution network 100, in accordance with one embodiment. The data collected by various sensors or devices in the fluid distribution network 100 is communicated to the system 200 through communication channel 202. The communication channel may include wired, wireless or a combination of wired and wireless means configured to communicate data from the sensors or devices in the network 100 to system 200.

The data received from the sensors or devices is used accordingly by the system 200 to determine various parameters. For example, data from sensors or devices configured with the reservoir 102 may be used to determine the water level in the reservoir 102, pressure of the water and the amount of water supplied by the reservoir 102. Accordingly, data from a flow sensor 108 located at the beginning of a water distribution block 114 may be used to determine the flow rate and the amount of water routed into a water distribution block 114. Similarly, data received from sensors or devices configured with water utilization units 110 may be used to determine the amount of water consumed by respective water utilization units 110.

In an embodiment, data received from sensors or devices configured with water utilization units 110, and the received data corresponding to water dispatched from the reservoir 102 may be used to determine the value of Non-Revenue Water (NRW). Value of NRW may indicate the amount of water that may have leaked in the fluid distribution network 100. It is noteworthy that the terminology NRW may be used to indicate fluid that may have leaked from a fluid distribution network configured to distribute the respective fluid.

Figure 3:
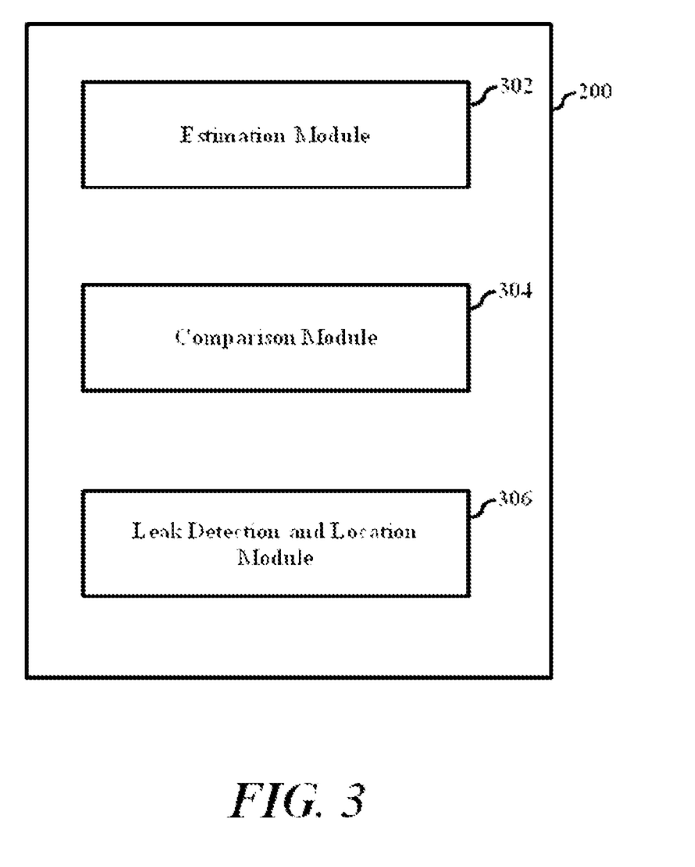
FIG. 3 is a block diagram illustrating a system configured to detect leaks and locate leak spots in the fluid distribution network, in accordance with one embodiment.

The system 200, in one embodiment, uses at least a portion of the data received from the network 100 to detect leaks and locate leak spots in the fluid distribution network 100. System 200 includes a virtual model of the fluid distribution network 100 to facilitate the same. Referring to FIG. 3, system 200 may comprise an estimation module 302, a comparison module 304 and a leak detection module 306.

Figure 4:
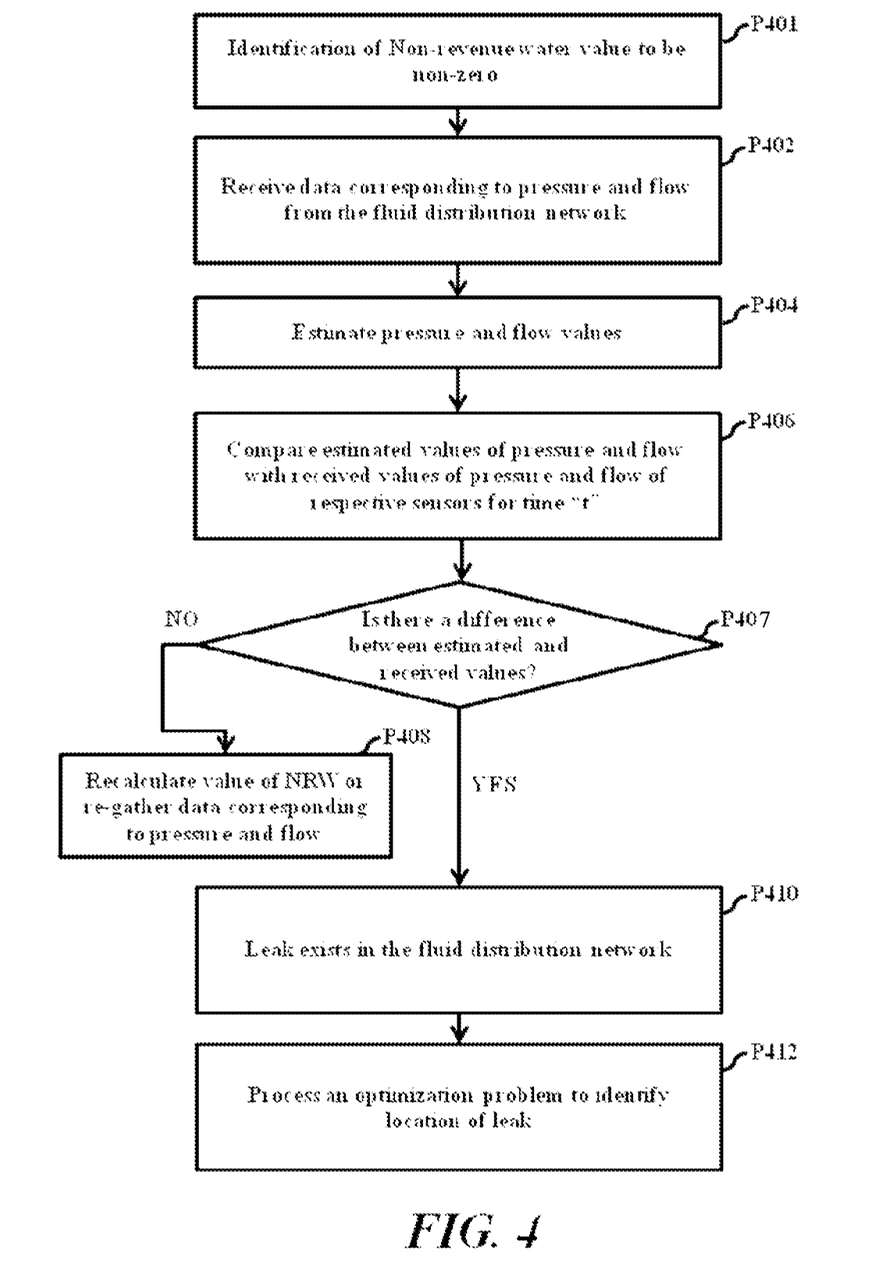
FIG. 4 is a flowchart illustrating a method for detecting leaks and locating leak spots in a fluid distribution network, in accordance with one embodiment.

Referring to FIG. 4, in an embodiment, the data received from sensors or devices configured with water utilization units 110, and the received data corresponding to water dispatched from the reservoir 102 may be used to determine the value of NRW. If there is a difference between the summation of data received from sensors or devices configured with water utilization units 110, and the received data corresponding to water dispatched from the reservoir 102, the value of NRW is identified to be non-zero; hence an indication that leak exists in network 100 (P401).

In an embodiment, upon determination of value of NRW to be non-zero, the comparison module 304 may compare flow and pressure data collected from flow sensors 108 and pressure sensors 106 with estimated flow and pressure values of the corresponding sensors. To facilitate such a comparison, comparison module 304 receives pressure and flow data from the network 100 (P402). The flow and pressure data may be collected by flow sensors 108 and pressure sensors 106, respectively over predetermined time periods for example.

In one embodiment, the pressure data at time "t" is given by the below notation:

$$\{\pi_r(t)\}_{S_P}$$

$$r=1$$

where $S_P$ is the number of pressure sensors.

Further, in one embodiment, the flow data at time "t" is given by the below notation:

$$\{\xi_s(t)\}_{S_Q}$$

$$S=1$$

where $S_Q$ is the number of flow sensors.

In one embodiment, assuming no leakage exists, estimator module 302 estimates pressure and flow values for pressure sensors $r=1 \ldots S_P$ and flow sensors $s=1 \ldots S_Q$ for time "t" (P404) according to the following notations, respectively:

$\{P_r(t)\}S_P$ $r=1$ $\{q_s(t)\}S_Q$ $s=1$

The comparison module 404 compares estimated values of pressure and flow with received values of pressure and flow of respective sensors for time "t" as received from network 100 (P406). It is noteworthy that estimated and the received values may change over time due to the changes in demand for the fluid at the fluid utilization units 110.

The comparison between the estimated and the received values corresponding to pressure and flow may be formulated as a test to verify whether the values satisfy the following equation:

$P_r(t) = \pi_r(t)$ wherein $r=1 \ldots S_P$ $t=\tau_k, \ldots \tau_l$ $q_s(t) = \xi_s(t)$ wherein $s=1 \ldots S_Q$ $t=\tau_k, \ldots \tau_l$ In an embodiment, if differences are not detected between the estimated values and received values (P407), then value of NRW is recalculated (P408). If the recalculated value of NRW is zero, then it may be inferred that leaks do not exist in network 100. On the other hand, if the recalculated value of NRW is non-zero, then field values of pressure and flow as received are re-read. Thereafter, the re-read values and estimated values are compared again (P407).

In one embodiment, if differences are not detected between the estimated values and received values (P407), then without recalculating the value of NRW, field values of pressure and flow are re-read. Thereafter, the re-read values and estimated values are compared again (P407). If differences are detected between the estimated values and received values (P407), then it may be inferred that one or more leaks may be present in network 100 (P410).

Leak detection module 306 may process an optimization problem to identify location of one or more leak spots within the network 100 (P412) by, for example, placing virtual nodes in the virtual model of the network 100. In one embodiment, the comparison between the estimated values and the received values may be carried out for a single time point.

Figure 5:
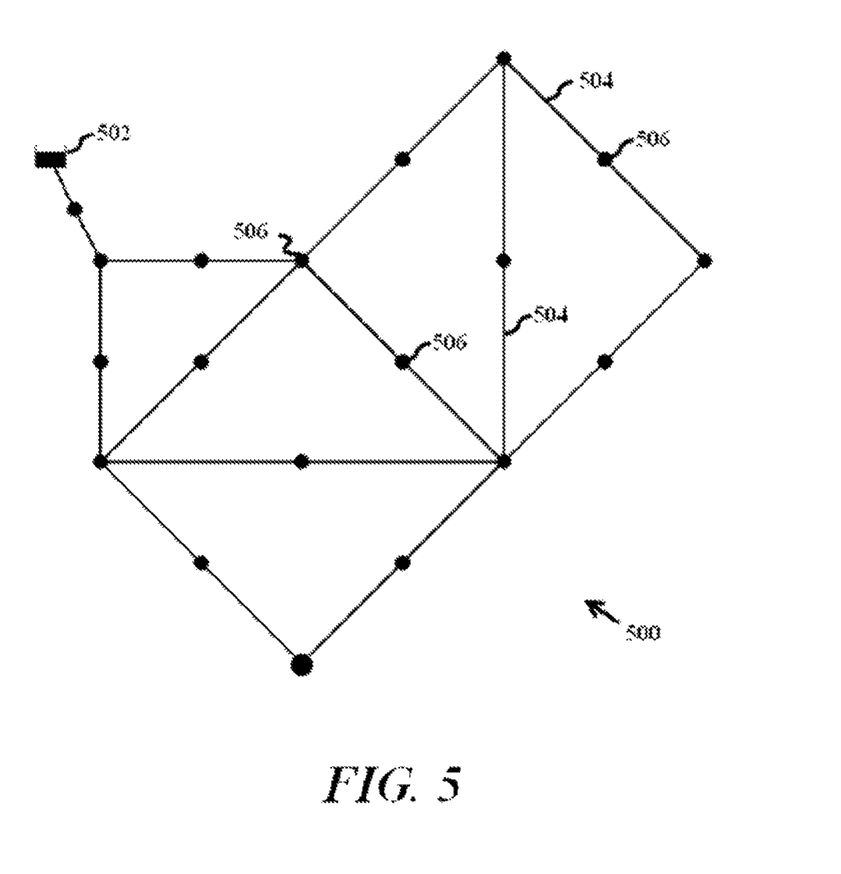
FIG. 5 is a line diagram illustrating virtual nodes on a virtual model of a fluid distribution network, in accordance with one embodiment.

Referring to FIG. 5, a line diagram illustrating virtual nodes 506 in a virtual model 500 of a fluid distribution network is provided, in accordance with one embodiment. Each of the virtual nodes 506 is a suspected to leak spot. As shown, the virtual nodes can be placed on any location of interest, such as pipes 504, junctions 506, other intersection of pipes, and valves. It shall be noted that a pipe 504 may have more than one virtual node 506 across its length.

In one embodiment, flow "q" at a virtual node 506 is modeled as $q=\alpha \cdot P^\beta$ where "P" is the pressure at the virtual node 506, and, $\alpha$ and $\beta$ are constants throughout all time horizons. Further, in one embodiment, a flow at the j$^{th}$ node 506 in the virtual model 500 at time "t" may be defined by:

$$p_j(t) = a_j \cdot P_j(t)^{b_j}$$

where $P_j$ is the pressure at time "t" at the j$^{th}$ node, and $0 \leq a_j \leq 1$. $b_j \geq 0$, in some embodiments, may be set to 0.5 as an approximation.

System 200 locates a leak spot in the virtual model 500, and thereby the fluid distribution network, when $a_j > 0$, wherein "j" is a virtual node 506. The values of "$a_j$" and "$b_j$" for a node "j" are determined upon solving the following optimization problem:

$$\text{minimize } \mathcal{L}(\{a_j\}_{j=1}^{N_p}, \{b_j\}_{j=1}^{N_p}) = \max_{[\tau_k,\tau_l] \in \theta} \left\{ \left| NRW_{[\tau_k,\tau_l]} - \sum_{j=1}^{N_p} \sum_{t=\tau_k}^{\tau_l} a_j \cdot P_j(t)^{b_j} \right| \right\}$$

subject to $P_r(t) = \pi_r(t) \; r=1 \ldots S_P \; t=\tau_k, \ldots \tau_l$ $q_s(t) = \xi_s(t) \; s=1 \ldots S_Q \; t=\tau_k, \ldots \tau_l$ $0 \leq a_j \leq 1 \; j=1 \ldots N_p$ $b_j > 0 \; j=1 \ldots N_p$ It is noteworthy that while the above implementation has been provided by way of example as applicable to fluid distribution networks, the concepts and principals disclosed herein may be applicable to other types of distribution networks in a similar or modified manner.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 6A:
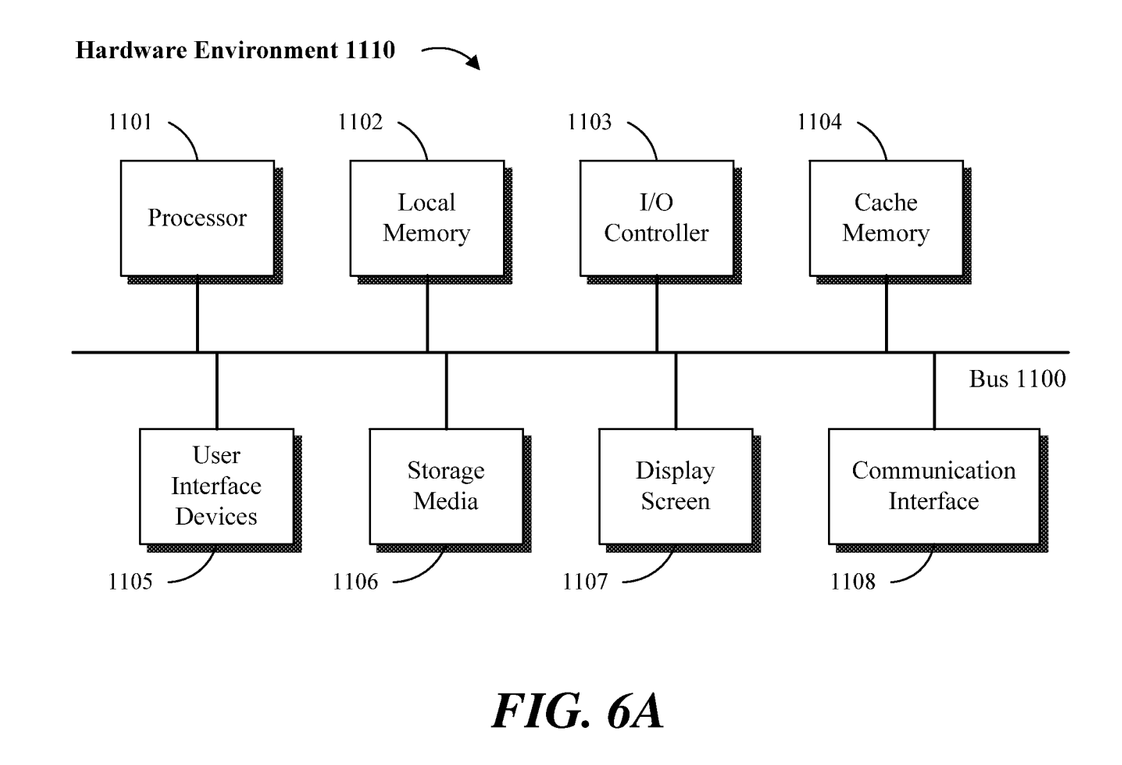
FIGS. 6A and 6B are block diagrams of hardware and software environments in which the disclosed systems and methods may operate, in accordance with one or more embodiments.
Figure 6B:
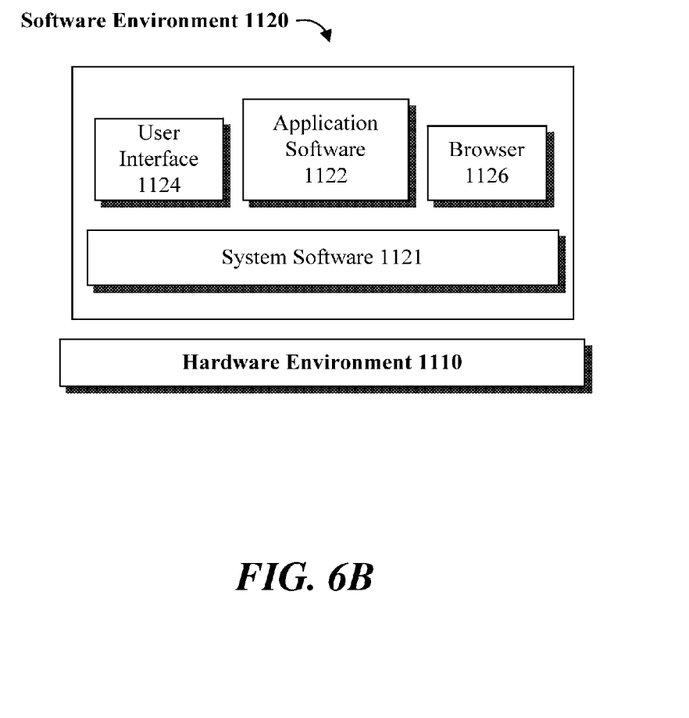

Referring to FIGS. 6A and 6B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying Operational settings and configurations, for the various components of hardware environment 1110.

Referring to FIG. 6A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. Examples of a computer readable storage medium may include a semiconductor or solid-state memory, magnetic tape, a removable computer diskette, a random access memory (RAM), a read-only memory (ROM), a rigid magnetic disk, and an optical disk. Current examples of optical disks include compact disk, read only memory (CD-ROM), compact disk read/write (CD-R/W), digital video disk (DVD), high definition video disk (HD-DVD) or Blue-ray™ disk. A computer readable storage medium can be any tangible medium that can contain or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example, communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 6B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment ma include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for detecting leaks and locating leak spots in a fluid distribution network, the method comprising:
    calculating value of non-revenue fluid;
    receiving data corresponding to pressure from pressure sensors in the fluid distribution network;
    receiving data corresponding to flow from flow sensors in the fluid distribution network;
    estimating pressure values at the pressure sensors; estimating flow values at the flow sensors;
    comparing received data and estimated values of respective sensors for corresponding time periods;
    detecting existence of leak in the fluid distribution network, if the value of non-revenue fluid is above a certain threshold; and
    locating one or more leak spots, if a leak is detected, by solving an optimization problem utilizing a virtual model of the fluid distribution network, the virtual model having a number of virtual nodes.

2. The method according to claim 1, wherein the received data and the estimated values are compared when the value of non-revenue fluid is greater than the certain threshold.

3. The method according to claim 1, wherein the pressure values at the pressure sensors are estimated according to the notation:

wherein $P_r(t)$ is the pressure at the $r^{th}$ pressure sensor at time t.

4. The method according to claim 1, wherein the flow values at the flow sensors are estimated according to the notation:

$$\{q_s(t)\}_{s=1}^{S_Q}$$

wherein $q_s(t)$ is flow at the $s^{th}$ flow sensor at time t.

5. The method according to claim 1, wherein comparing received data and estimated values of respective pressure sensors for corresponding time periods are formulated as a test whether the values satisfy the following equation:

$$P_r(t) = \pi_r(t)$$

wherein $\pi_r(t)$ is the received pressure value for the $r^{th}$ sensor corresponding, to time t, $r=1 \ldots S_p$ and $t=\tau_k, \ldots \tau_l$.

6. The method according to claim 1, wherein comparing received data and estimated values of respective flow sensors for corresponding time periods are formulated as a test to verify whether the values satisfy the following equation:

$$q_s(t) = \xi_s(t)$$

wherein $\xi_s(t)$ is the received flow value for the $s^{th}$ flow sensor corresponding to time t, $s=1 \ldots S_Q$ and $t=\tau_k, \ldots \tau_l$.

7. The method according to claim 1, wherein locating one or more leak spots further comprises generating the virtual model of the fluid distribution network.

8. The method according to claim 7 further comprising locating the virtual nodes in the virtual model.

9. The method according to claim 8 further comprising identifying one or more of the virtual nodes as the potential leak spots.

10. The method according to claim 9 further comprising locating the one or ore virtual nodes as the leak spot by solving the following optimization problem:

$$\text{minimize } \mathcal{L}(\{a_j\}_{j=1}^{N_p}, \{h_j\}_{j=1}^{N_F}) = \max_{[\tau_k, \tau_l] \in \theta} \left\{ \left\| NRW_{[\tau_k, \tau_l]} - \sum_{j=1}^{N_p} \sum_{t=\tau_k}^{\tau_l} a_j \cdot P_j(t)^{b_j} \right\| \right\}$$

subject to $$P_r(t) = \pi_r(t) \; r=1 \ldots S_p \; t=\tau_k, \ldots \tau_l$$

$$q_s(t) = \xi_s(t) \; s=1 \ldots S_Q \; t=\tau_k, \ldots \tau_i$$

$$0 \le a_j \le 1, \; i=1 \ldots N_p$$

$$b_j > 0 \; j=1 \ldots N_p$$

wherein, the virtual node j is identified as the leak spot if $a_j > 0$.

11. A system for detecting leaks and, locating leak spots in a fluid distribution network, the system comprising:
an estimation module configured to:
estimate, pressure values at pressure sensors and flow values at flow sensors; and
calculate value of non-revenue fluid; a comparison module configured to
a comparison module configured to:
receive data corresponding to pressure from the pressure sensors in the fluid distribution network;
receive data corresponding to flow from the flow sensors in the fluid distribution network; and
compare received data and estimated values of respective sensors for corresponding time periods;
a leak detection and location module configured to;
detect existence of leak in the fluid distribution network if the value of non revenue fluid is greater than zero; and
locate one or more leak spots, if a leak is detected, by solving an optimization equation utilizing a virtual model of the fluid distribution network, the virtual model having a number of virtual nodes.

12. The system according to claim 11, wherein the estimation module is configured to estimate pressure values at the pressure sensors according; to the notation:

$$\{P_r(t)\}_{r=1}^{S_p}$$

wherein $P_r(t)$ is the pressure at the $r^{th}$ pressure sensor at time t.

13. The system according to claim 11, wherein the estimation module is configured to estimate flow values at the flow sensors according to the notation:

$$\{q_s(t)\}_{s=1}^{S_Q}$$

wherein $q_s(t)$ is flow at the $s^{th}$ flow sensor at time t.

14. The system according to claim 11, wherein comparing received data and estimated values of respective pressure sensors for corresponding time periods is formulated as a test to verify whether the values satisfy the following equation:

$$P_r(t) = \pi_r(t)$$

wherein $\pi_r(t)$ is the received pressure value for the $r^{th}$ sensor corresponding to time t, $r=1 \ldots S_p$ and $t=\tau_k, \ldots \tau_l$.

15. The system according to claim 11, wherein comparing received data and estimated values of respective flow sensors for corresponding time periods is formulated as a test to verify whether the values satisfy the following equation:

$$q_s(t) = \xi_s(t)$$

wherein, $\xi_s(t)$ is the received flow value for the $s^{th}$ flow sensor corresponding to time t, $s=1 \ldots S_Q$ and $t=\tau_k, \ldots \tau_l$.

16. The system according to claim 11, wherein the comparison module is configured to compare the received data and the estimated values when the value of non revenue fluid is greater than zero.

17. The system according to claim 11, wherein the leak detection and location module locating is configured to facilitate generation of the virtual model of the fluid distribution network.

18. The system according to claim 17, wherein the leak detection and location module locating is further configured to facilitate location of the virtual nodes in the virtual model.

19. The system according, to claim 18, wherein the leak detection and location module locating is further configured to identify one or more of the virtual nodes as the potential leak spot.

20. The system according to claim 19, wherein the leak detection and location module locating is further configured to locate the one or more virtual nodes as the leak spot by solving the following optimization problem:

$$\text{minimize } \mathcal{L}\left(\{a_j\}_{j=1}^{N_p}, \{b_j\}_{j=1}^{N_p}\right) = \max_{[\tau_k, \tau_l] \in \theta} \left\{ \left\| NRW_{[\tau_k, \tau_l]} - \sum_{j=1}^{N_p} \sum_{t=\tau_k}^{\tau_l} a_j \cdot P_j(t)^{b_j} \right\| \right\}$$

subject to $$P_r(t) = \pi_r(t) \; r=1 \ldots S_P \; t=\tau_k, \ldots \tau_l$$

$$q_s(t) = \xi_s(t) \; s=1 \ldots S_Q \; t=\tau_k, \ldots \tau_l$$

$$0 \leq a_j \leq 1, \; i=1 \ldots N_p$$

$$b_j > 0 \; j=1 \ldots N_p$$

wherein the virtual node is identified as the leak spot if of $a_j > 0$.

21. A computer program product comprising a computer readable storage medium baking a computer readable program, wherein the computer readable program when executed on a computer causes the computer to:
  calculate value of non-revenue fluid;
  receive data corresponding to pressure from pressure sensors in a fluid distribution network;
  receive data corresponding to flow from flow sensors in the fluid distribution network;
  estimate pressure values at the pressure sensors;
  estimate flow values at the flow sensors;
  compare received data and estimated values of respective sensors for corresponding time periods;
  detect existence of leak in the fluid distribution network if a difference is identified from the comparison; and
  locate one or more leak spots, if a leak is detected, by solving, an optimization equation utilizing a virtual model of the fluid distribution network, the virtual model having a number of virtual nodes.

22. The computer program product according to claim 21, wherein the computer readable program when executed on a computer further causes the computer to compare the received data and the estimated values when the value of non-revenue fluid is greater than zero.

23. The computer program product according to claim 21, wherein the pressure values at the pressure sensors is estimated according to the notation:

$$[P_r(t)]_{r=1}^{S_p}$$

wherein, $P_r(t)$ is the pressure at the $r^{th}$ pressure sensor at time t.

24. The computer program product according to claim 21, wherein the flow values at the flow sensors is estimated according to the notation:

$$\{q_s(t)\}_{s=1}^{S_Q}$$

wherein, $q_s(t)$ is flow at the $s^{th}$ flow sensor at time t.

25. The computer program product according to claim 21, wherein comparing received data and estimated values of respective pressure sensors for corresponding time periods is formulated as a test to verify whether the values satisfy the following equation:

$$P_r(t) = \pi_r(t)$$

wherein, $\pi_r(t)$ is the received pressure value for the $r^{th}$ sensor corresponding to time t, $r=1 \ldots S_p$ and $t=\tau_k, \ldots \tau_l$.

* * * * *